US007429714B2

(12) United States Patent
DePetrillo et al.

(10) Patent No.: US 7,429,714 B2

(45) Date of Patent: Sep. 30, 2008

(54) MODULAR ICP TORCH ASSEMBLY

(75) Inventors: Albert R. DePetrillo, Folsom, CA (US); Craig R. Heden, Pacifica, CA (US); Robert M. McGuire, Aptos, CA (US)

(73) Assignee: Ronal Systems Corporation, Mountain View, CA (US)

(*) Notice: Subject to any disclaimer, the term of this patent is extended or adjusted under 35 U.S.C. 154(b) by 0 days.

(21) Appl. No.: 10/601,711

(22) Filed: Jun. 20, 2003

(65) Prior Publication Data

US 2004/0256365 A1 Dec. 23, 2004

(51) Int. Cl.
*B23K 9/00* (2006.01)

(52) U.S. Cl. ............................ 219/121.48; 219/121.49; 219/121.5

(58) Field of Classification Search ............ 219/121.11, 219/121.36, 121.48, 121.49, 121.5, 121.51
See application file for complete search history.

(56) References Cited

U.S. PATENT DOCUMENTS

| | | | | |
|---|---|---|---|---|
| 3,622,493 A | | 11/1971 | Crusco | |
| 3,625,846 A | | 12/1971 | Murdoch et al. | |
| 3,652,434 A | | 3/1972 | Bar-Nun et al. | |
| 3,657,107 A | | 4/1972 | Harriman et al. | 204/323 |
| 3,658,673 A | | 4/1972 | Kugler et al. | |
| 3,869,616 A | | 3/1975 | Smars et al. | |
| 3,919,397 A | | 11/1975 | Gould | |
| 3,938,988 A | | 2/1976 | Othmer | |
| 3,954,954 A | | 5/1976 | Davis et al. | |
| 4,145,403 A | | 3/1979 | Fey et al. | |
| 4,266,113 A | | 5/1981 | Denton et al. | 219/121 |
| 4,390,405 A | | 6/1983 | Hahn et al. | |
| 4,482,525 A | | 11/1984 | Chen | |
| 4,512,868 A | | 4/1985 | Fujimura et al. | |
| 4,739,147 A | | 4/1988 | Meyer et al. | |
| 4,766,287 A | | 8/1988 | Morrisroe et al. | |
| 4,794,230 A | | 12/1988 | Seliskar et al. | 219/121.52 |
| 4,812,201 A | | 3/1989 | Sakai et al. | |
| 4,812,326 A | | 3/1989 | Tsukazaki et al. | |
| 4,883,570 A | | 11/1989 | Efthimion et al. | |
| 4,898,748 A | | 2/1990 | Kruger, Jr. | |
| 4,926,001 A | | 5/1990 | Alagy et al. | |
| 4,926,021 A | * | 5/1990 | Streusand et al. | 219/121.59 |
| 4,973,773 A | | 11/1990 | Malone | |
| 5,012,065 A | | 4/1991 | Rayson et al. | |
| 5,026,464 A | | 6/1991 | Mizuno et al. | |
| 5,051,557 A | | 9/1991 | Satzger | |
| 5,200,595 A | | 4/1993 | Boulos et al. | |
| 5,338,399 A | | 8/1994 | Yanagida | |
| 5,403,434 A | | 4/1995 | Moslehi | |
| 5,427,669 A | | 6/1995 | Drummond | |
| 5,531,973 A | | 7/1996 | Sarv | |
| 5,535,906 A | | 7/1996 | Drummond | |
| 5,560,844 A | | 10/1996 | Boulos et al. | |
| 5,599,425 A | | 2/1997 | Lagendijk et al. | |

(Continued)

*Primary Examiner*—Tu Hoang
(74) *Attorney, Agent, or Firm*—Martine, Penilla & Gencarella, LLP

(57) ABSTRACT

A modular inductively coupled plasma torch assembly is described. A rear connector unit is positioned and detachably held at a rear end of a tubular plasma chamber to provide a flow of material into it. Detachable connector units are positioned on opposite ends of a tubular jacket, and hold the tubular plasma chamber concentrically within the tubular jacket so as to define an annular chamber between the two tubes. An inductor coil is disposed concentrically around the tubular jacket and energized so as to generate plasma from the material flowing in the tubular plasma chamber. To cool the tubular plasma chamber, coolant flows through the annular chamber using inlet and outlet ports in the detachable connector units for such flow of coolant.

43 Claims, 7 Drawing Sheets

U.S. PATENT DOCUMENTS

| | | | | |
|---|---|---|---|---|
| 5,607,602 | A | 3/1997 | Su et al. | |
| 5,620,559 | A | 4/1997 | Kikuchi | |
| 5,652,021 | A | 7/1997 | Hunt et al. | |
| 5,665,640 | A | 9/1997 | Foster et al. | |
| 5,684,581 | A | 11/1997 | French et al. | |
| 5,747,935 | A | 5/1998 | Porter et al. | |
| 5,756,402 | A | 5/1998 | Jimbo et al. | |
| 5,770,099 | A | 6/1998 | Rice et al. | |
| 5,827,370 | A | 10/1998 | Gu | |
| 5,853,602 | A | 12/1998 | Shoji | |
| 5,877,471 | A | 3/1999 | Huhn et al. | 219/121.49 |
| 5,906,758 | A | 5/1999 | Severance, Jr. | 219/121.5 |
| 5,908,566 | A | 6/1999 | Seltzer | |
| 5,917,286 | A | 6/1999 | Scholl et al. | |
| 5,935,334 | A | 8/1999 | Fong et al. | |
| 5,939,886 | A | 8/1999 | Turner et al. | |
| 6,007,879 | A | 12/1999 | Scholl | |
| 6,046,546 | A | 4/2000 | Porter et al. | |
| 6,053,123 | A | 4/2000 | Xia | |
| 6,066,568 | A | 5/2000 | Kawai et al. | |
| 6,156,667 | A | 12/2000 | Jewett | |
| 6,163,006 | A | 12/2000 | Doughty et al. | |
| 6,183,605 | B1 | 2/2001 | Schatz et al. | |
| 6,194,036 | B1 | 2/2001 | Babayan et al. | |
| 6,197,119 | B1 | 3/2001 | Dozoretz et al. | |
| 6,217,717 | B1 | 4/2001 | Drummond et al. | |
| 6,222,321 | B1 | 4/2001 | Scholl et al. | |
| 6,225,592 | B1 | 5/2001 | Doughty | |
| 6,238,514 | B1 | 5/2001 | Gu | |
| 6,251,792 | B1 | 6/2001 | Collins et al. | |
| 6,291,938 | B1 | 9/2001 | Jewett et al. | |
| 6,328,804 | B1 | 12/2001 | Murzin et al. | 118/715 |
| 6,368,477 | B1 | 4/2002 | Scholl | |
| 6,384,540 | B1 | 5/2002 | Porter, Jr. et al. | |
| 6,410,880 | B1 | 6/2002 | Putvinski et al. | |
| 6,432,260 | B1 | 8/2002 | Mahoney et al. | |
| 6,488,745 | B2 | 12/2002 | Gu | |
| 6,494,957 | B1 | 12/2002 | Suzuki | |
| 6,521,099 | B1 | 2/2003 | Drummond et al. | |
| 6,521,792 | B2 | 2/2003 | Akteries et al. | |
| 6,544,896 | B1 | 4/2003 | Xu et al. | |
| 6,633,017 | B1 | 10/2003 | Drummond et al. | |
| 6,713,711 | B2 * | 3/2004 | Conway et al. | 219/121.48 |
| 2002/0134244 | A1 | 9/2002 | Gu | |
| 2003/0077402 | A1 | 4/2003 | Amann et al. | |

* cited by examiner

MODULAR ICP TORCH ASSEMBLY

FIELD OF THE INVENTION

The present invention generally relates to inductively coupled plasma ("ICP") torches and in particular, to a modular ICP torch assembly.

BACKGROUND OF THE INVENTION

ICP torches have a long history in semiconductor processing and spectrographic applications. Commonly used ICP torches, however, are not easy to disassemble, thereby making repair and maintenance of the torch difficult. This results in undesirable equipment down time that, in a manufacturing environment, can significantly reduce production volume and increase per unit costs. Further, different applications or processing requirements often require different ICP torch configurations, component dimensions, and/or component materials. Consequently, multiple ICP torches may be used in the manufacturing or a test environment, thereby increasing manufacturing and/or test costs. Still further, coolant tubes that are fused in ICP torches to their plasma chambers to cool them down are subject to cracking and consequently, leaking of the coolant into the plasma chambers.

OBJECTS AND SUMMARY OF THE INVENTION

Accordingly, it is an object of the present invention to provide an ICP torch that is easily assembled and disassembled to minimize equipment down time.

Another object is to provide an ICP torch that is modular in design so that component parts can be mixed and matched to suit their application use.

Another object is to provide an ICP torch that includes a coolant mechanism that avoids contamination of the plasma chamber upon failure, and is easily replaced.

Still another object is to provide an ICP torch that is reliable, efficient, high performing, and cost effective.

These and additional objects are accomplished by the various aspects of the present invention, wherein briefly stated, one aspect is a modular ICP torch assembly comprising a tubular plasma chamber, a tubular jacket, and detachable connector units. The detachable connector units hold the tubular plasma chamber concentrically within the tubular jacket so as to define an annular chamber between the two, and provide a flow of coolant through the annular chamber to cool the outer surface of the tubular plasma chamber.

Another aspect is a modular ICP torch assembly comprising a tubular plasma chamber, a rear connector unit, and an inductive coupling member. The rear connector unit is positioned and detachably held at a rear end of the tubular plasma chamber to provide a flow of material into the tubular plasma chamber. The inductive coupling member is for inductively applying energy to the material flowing through the tubular plasma chamber in order to produce and sustain plasma in the chamber.

Still another aspect is a modular inductively coupled plasma torch assembly. A rear connector unit is positioned and detachably held at a rear end of a tubular plasma chamber to provide a flow of material into it. Detachable connector units are positioned on opposite ends of a tubular jacket, and hold the tubular plasma chamber concentrically within the tubular jacket so as to define an annular chamber between the two tubes. An inductor coil is disposed concentrically around the tubular jacket and energized so as to generate plasma from the material flowing in the tubular plasma chamber. To cool the tubular plasma chamber, coolant flows through the annular chamber using inlet and outlet ports in the detachable connector units for such flow of coolant.

Additional objects, features and advantages of the various aspects of the present invention will become apparent from the following description of its preferred embodiment, which description should be taken in conjunction with the accompanying drawings.

DETAILED DESCRIPTION OF THE PREFERRED EMBODIMENT

Figure 1:
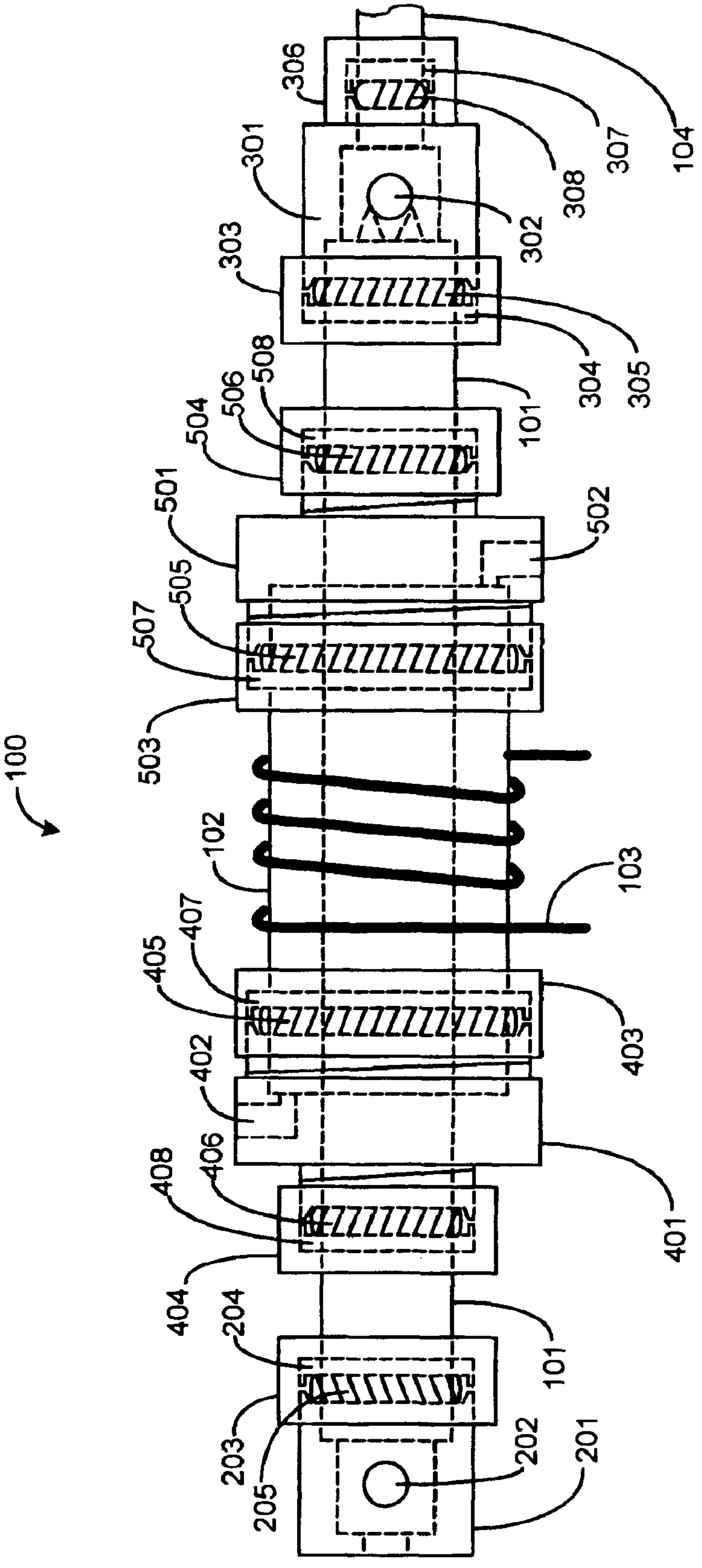
FIG. 1 illustrates a side view of a modular ICP torch assembly utilizing aspects of the present invention.

FIG. 1 illustrates a side view of a modular ICP torch assembly 100 including a tubular plasma chamber 101, a tubular jacket 102 that is disposed concentrically around the tubular plasma chamber 101, and an inductor coil 103 that is disposed concentrically around the tubular jacket 102. The induction coil 103 preferably has a coil diameter that is slightly larger than the outer diameter of the tubular jacket 102 so that the tubular jacket 102 can fit comfortably, yet snugly in the induction coil 103. On the other hand, the tubular jacket 102 preferably has an inner diameter that is significantly larger than the outer diameter of the tubular plasma chamber 101 so that an annular chamber sufficient in size to accommodate desired coolant volume flow rate is defined between the inner surface of the tubular jacket 102 and the outer surface of the tubular plasma chamber 101.

In operation, the inductor coil 103 is energized while source material commonly in gaseous form flows by the induced field to generate plasma in the tubular plasma chamber 101. The composition and form of such material are chosen according to the application of the ICP torch assembly 100. Although an inductor coil is shown in this example for inductively applying energy to the source material, other means for doing so are also contemplated to be within the scope of the present invention. Additional details on the operation of and application examples for an ICP torch are described in commonly owned U.S. patent application Ser. No. 10/404,216 entitled "Remote ICP Torch for Semiconductor Processing," which is incorporated herein by this reference.

Since the generation of plasma in the tubular plasma chamber 101 causes the tubular plasma chamber 101 to heat up, coolant is passed through the annular chamber defined between the concentrically aligned tubular plasma chamber 101 and tubular jacket 102 to cool the outer surface of the tubular plasma chamber 101. The coolant may be in gaseous or liquid form, and may flow at various flow rates according to the application of the ICP torch assembly 100. As an example, deionized water is a commonly used coolant in ICP torch applications.

Also included in the modular ICP torch assembly 100 are several detachable connector units. These units serve to not only hold the various components of the modular ICP torch assembly 100 together, but they also provide inlet ports for source material to flow into the tubular plasma chamber 101, and inlet and outlet ports for the coolant to flow into and out of the annular chamber defined between the tubular jacket 102 and the tubular plasma chamber 101. Note that FIG. 1 only shows simplified versions of these detachable connector units. Therefore, FIGS. 2~10 are provided for a better understanding of their construction, assembly and operation.

Figure 2:
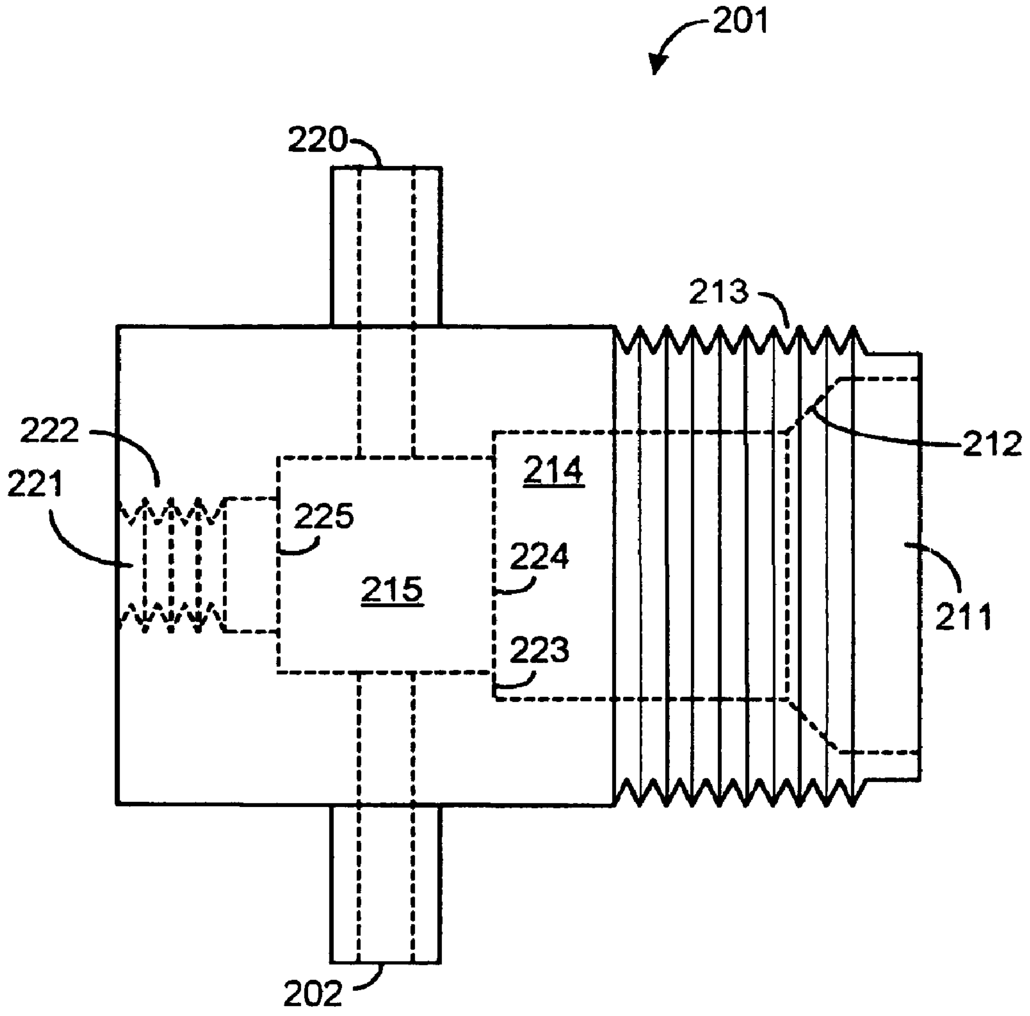
FIG. 2 illustrates a top view of a detachable rear connector unit included in a modular ICP torch assembly, utilizing aspects of the present invention.

A detachable rear connector unit includes a rear connector 201 whose top view is shown in detail in FIG. 2. As shown in more detail in FIG. 10, the rear connector 201 has an open end 211 through which a rear end of the tubular plasma chamber 101 is positioned and held in place by a cinch nut 203, a seal ring 204, a compressible O-ring 205, and slip washer ring 206. The cinch nut 203 is shown in more detail for front and side views respectively in FIGS. 6 and 7, and the seal ring 204 is shown in more detail for front and side views respectively in FIGS. 8 and 9. The O-ring 205 and the slip washer ring 206 are simply well known "O" shaped components and therefore, are not separately shown in detail.

The cinch nut 203, the slip washer ring 206, the seal ring 204, and the O-ring 205 are each placed in that order around the tubular plasma chamber 101, and slided down part way along its outer surface to get temporarily out of the way. The tubular plasma chamber 101 is then inserted into the open end 211 of the rear connector 201 until it nears or stops against an annular rear wall 223 of an outer cylindrical cavity 214 of the rear connector 201. The diameter of the outer cylindrical cavity 214 is preferably approximately the same as that of the tubular plasma chamber 101 so that the tubular plasma chamber 101 fits snugly in the outer cylindrical cavity 214 with minimal lateral movement when inserted therein. The O-ring 205 is then slided back down the outer surface of the tubular plasma chamber 101 until it stops against a tapered wall 212 of the rear connector 201. Likewise, the seal ring 204, slip washer ring 206, and cinch nut 203 are also slided back down along the outer surface of the tubular plasma chamber 101 until inner threads 604 of the cinch nut 203 engage outer threads 213 of the rear connector 201.

The cinch nut 203 is then screwed into the outer threading of the connector 201 so the seal ring 204 is pushed into compressing the O-ring 205 against the tapered wall 212 of the rear connector 201, thereby generating compression forces within the thus compressed O-ring 205 that radiate outward from the O-ring 205 and against the seal ring 204, the tapered wall 212, and the outer surface of the tubular plasma chamber 101, so as to securely hold the rear connector 201 in place against the tubular plasma chamber 101. The slip washer ring 206 placed between the seal ring 204 and the cinch nut 203 serves to inhibit torque applied to the cinch nut 203 (e.g., for screwing it into the outer threading 213 of the rear connector 201) from being transferred to the O-ring 205.

The rear connector 201 also has two inlet ports 202 and 220 for receiving material flows from external material sources and providing the material flows into the tubular plasma chamber 101. The inlet ports 202 and 220 utilize compression type fittings in order to accommodate hoses connected at opposite ends to the external material sources. The materials provided at inlet ports 202 and 220 may be different materials or the same material according to the application of the modular ICP torch 100. Materials entering through inlet ports 202 and 220 first enter an inner cylindrical cavity 215 before exiting through a circular opening 224 into the interior of the tubular plasma chamber 101 which is positioned in the outer cylindrical cavity 214 through open end 211 of the rear connector 201. The width of the annular wall 223 used as a stop for the tubular plasma chamber 101 is determined by the difference in diameters of the circular opening 224 and the outer cylindrical cavity 214.

A sapphire window 225 prevents the flows of materials from exiting the inner cavity 215 through an opening 221 included in the back of the rear connector 201. The internally threaded opening 221 is included in the back of the rear connector 201 so that an optical emission spectrometer or other metrology system may be attached to the modular ICP torch 100. The optical emission spectrometer views the plasma generated in the tubular plasma chamber 101 in this case through the sapphire window 225.

Figure 4:
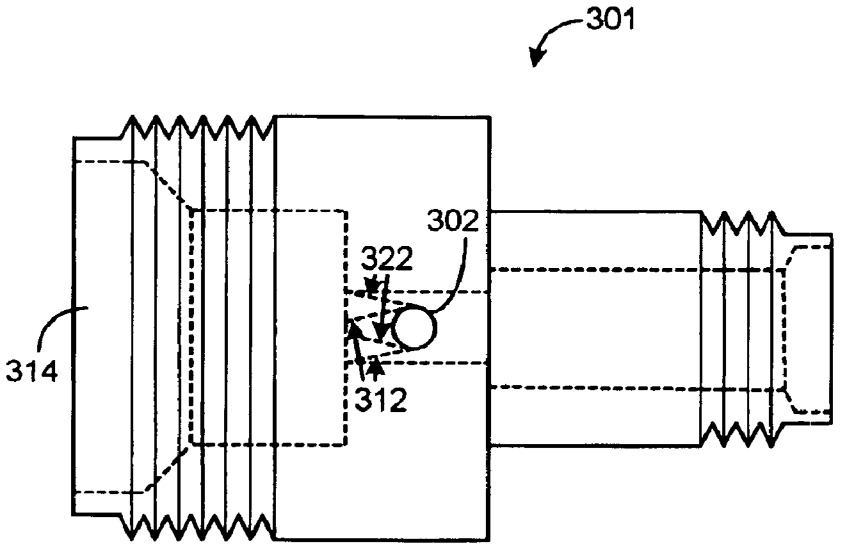
FIG. 4 illustrates a side view of a detachable front connector unit included in a modular ICP torch assembly, utilizing aspects of the present invention.
Figure 3:
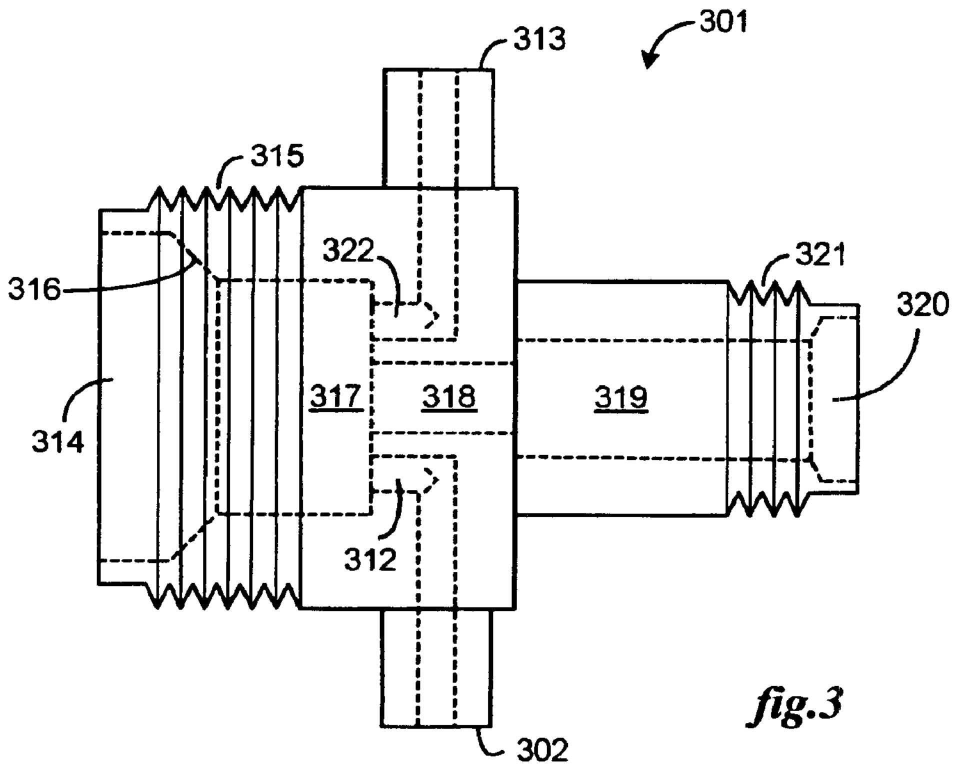
FIG. 3 illustrates a top view of a detachable front connector unit included in a modular ICP torch assembly, utilizing aspects of the present invention.
Figure 5:
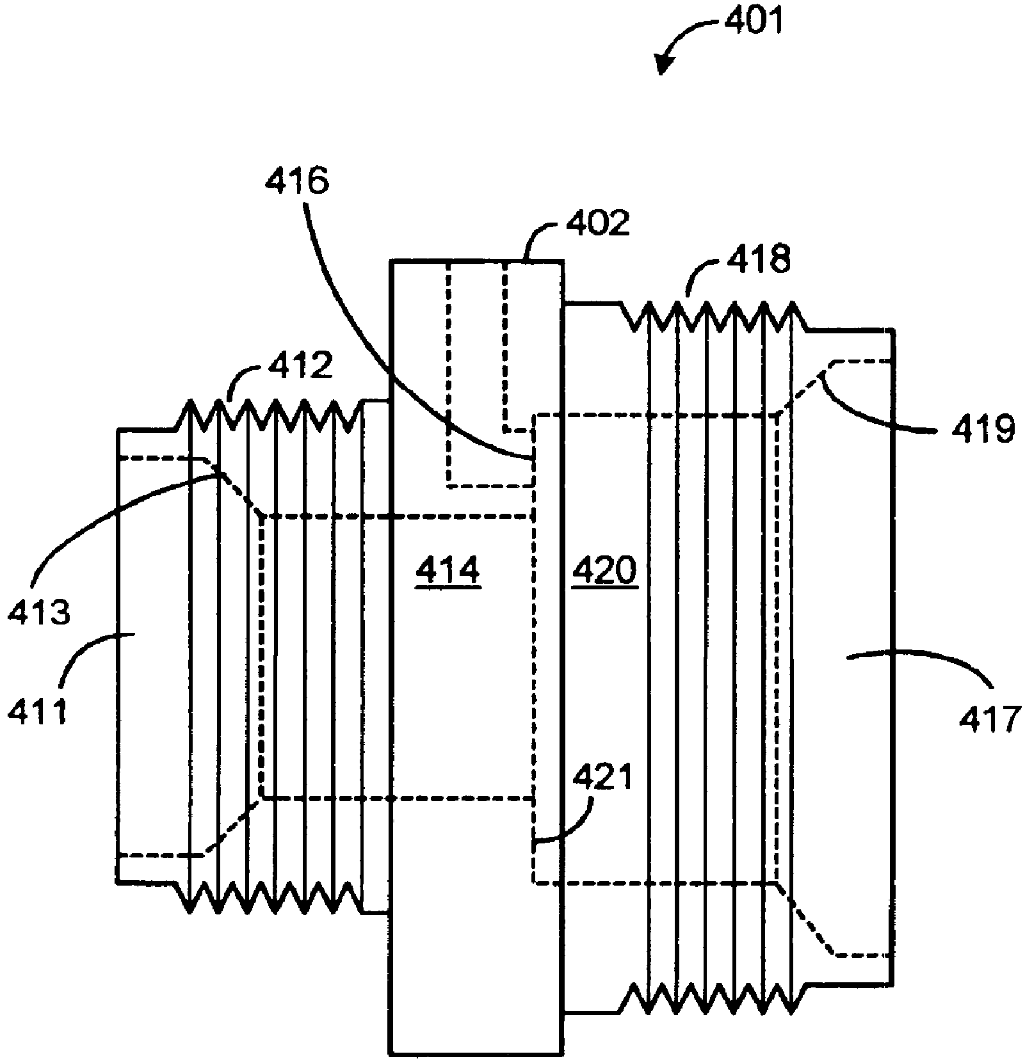
FIG. 5 illustrates a side view of a detachable jacket connector unit included in a modular ICP torch assembly, utilizing aspects of the present invention.
Figure 6:
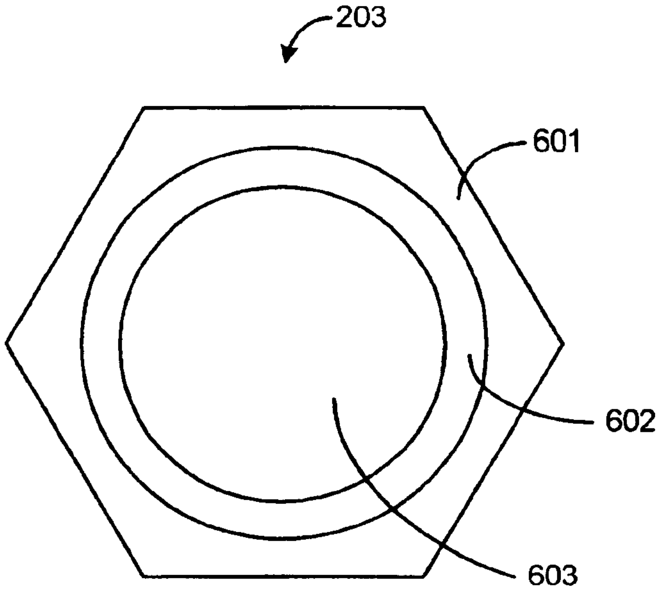
FIG. 6 illustrates a front view of a cinch nut included in a modular ICP torch assembly, utilizing aspects of the present invention.
Figure 7:
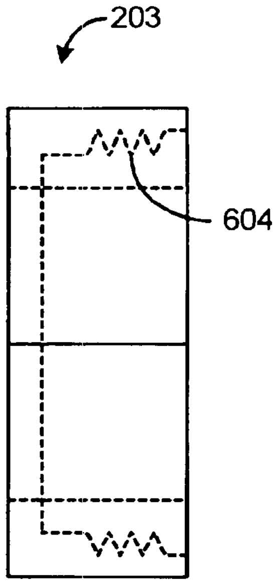
FIG. 7 illustrates a side view of a cinch nut included in a modular ICP torch assembly, utilizing aspects of the present invention.
Figure 8:
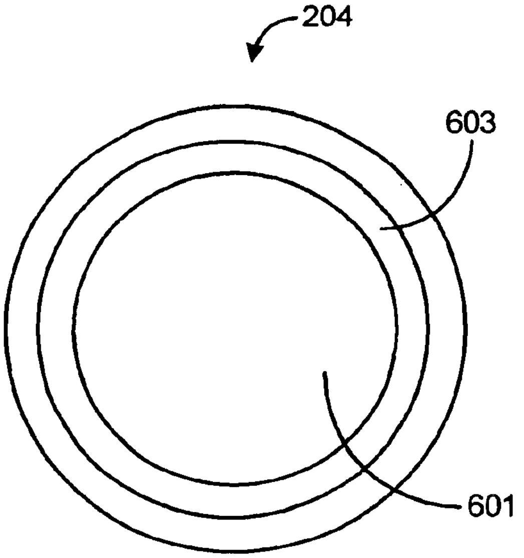
FIG. 8 illustrates a front view of a seal ring included in a modular ICP torch assembly, utilizing aspects of the present invention.
Figure 9:
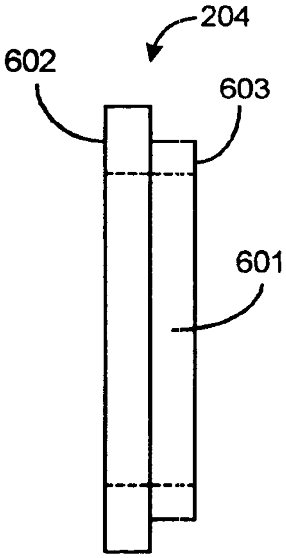
FIG. 9 illustrates a side view of a seal ring included in a modular ICP torch assembly, utilizing aspects of the present invention.
Figure 10:
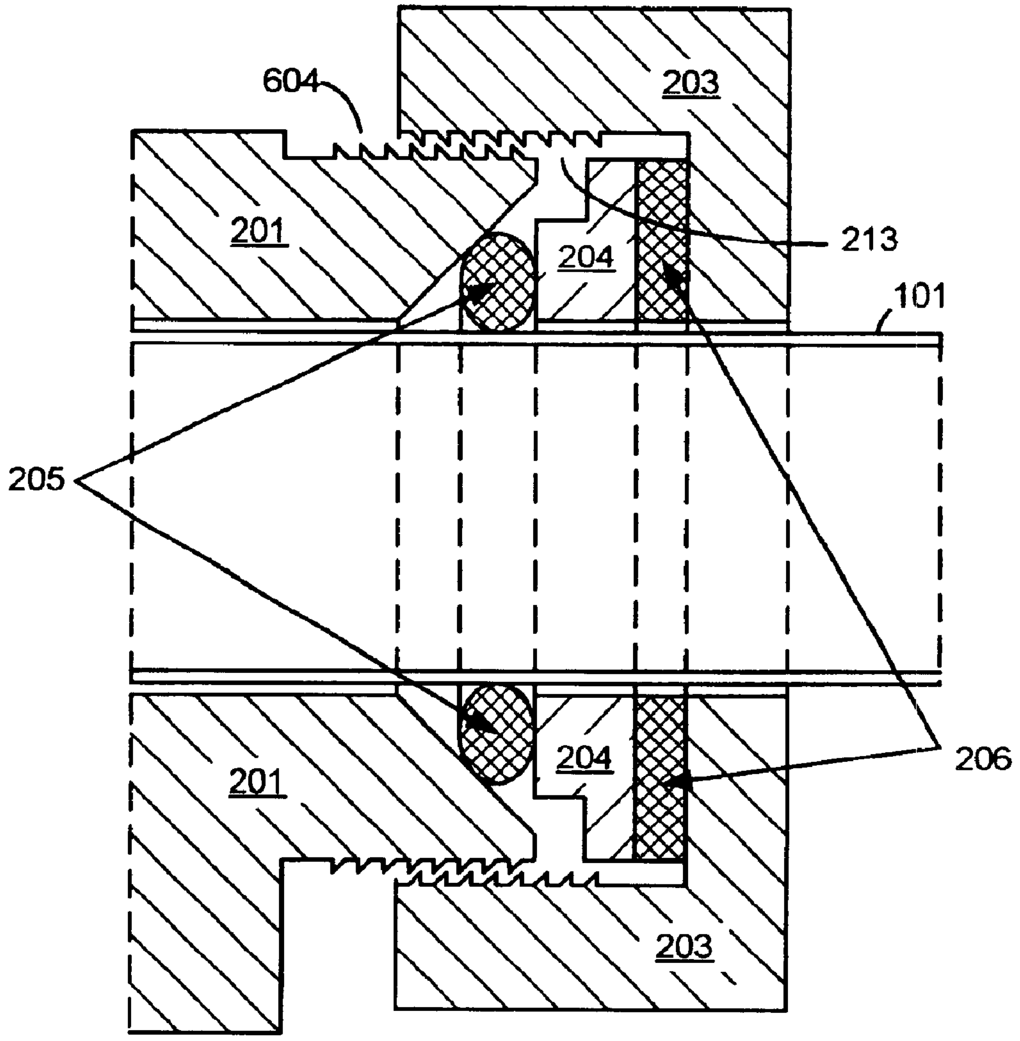
FIG. 10 illustrates a cross-sectional view of one end of a detachable connector, utilizing aspects of the present invention.

A detachable front connector unit includes a front connector 301 whose top view is shown in detail in FIG. 3 and side view shown in detail in FIG. 4. The front connector 301 has a first open end 314 adapted to receive a front end of the tubular plasma chamber 101, and a second open end 320 adapted to receive tubing 104 that is fludically coupled, for example, to a processing chamber for processing at least one semiconductor wafer. The tubular plasma chamber 101 is positioned and held in place with respect to the front connector 301 by a cinch nut 303, a seal ring 304, a compressible O-ring 305, and slip washer ring (not shown), in much the same manner as described in reference to their counterparts in the rear connector unit as previously described. Likewise, the tubing 104 is positioned and held in place with respect to the front connector 301 by a cinch nut 306, a seal ring 307, a compressible O-ring 308, and slip washer ring (not shown), also in much the same manner as described in reference to their counterparts in the rear connector unit as previously described.

A first cylindrical cavity 317 in the front connector 301 receives the tubular plasma chamber 101 through the first open end 314, and a second cylindrical cavity 319 receives the tubing 104 through the second open end 320. An inner cylindrical cavity 318 fluidically couples the first and second cylindrical cavities 317 and 319 so that plasma generated material flowing into the first open end 314 passes out of the second open end 320. The diameter of the first cylindrical cavity 314 is preferably approximately the same as that of the tubular plasma chamber 101 so that the tubular plasma chamber 101 fits snugly in the first cylindrical cavity 314 with minimal lateral movement when inserted therein. The diameter of the first cylindrical cavity 314 is also preferably larger than that of the inner cylindrical cavity 318 by an amount sufficient to define an annular wall at the rear of the first cylindrical cavity 317 that serves as a stop for the tubular plasma chamber 101, as well as providing sufficient thickness to accommodate flared inlet channels 312 and 322. The second cylindrical cavity 319 is also larger than the diameter of the inner cylindrical cavity 318 by an amount sufficient to define an annular wall at the rear of the second cylindrical cavity 319 that serves as a stop for the tubing 104. The diameter of the second cylindrical cavity 319 is smaller than that of the first cylindrical cavity 317 in this example so as to increase the flow rate of plasma generated material going into the tubing 104.

The front connector 301 has two inlet ports 302 and 313 adapted, for example, for compression fittings or other hose coupling mechanism for receiving material flows from external material sources and directing the material flows into the tubular plasma chamber 101 through flared inlet channels 312 and 322 so as to flow back towards, and in some applications be part of, the generation of plasma in the tubular plasma chamber 101. The inlet channels 312 and 322 are flared so that their material flows are at angles from the axis of the tubular plasma chamber 101, thus resulting in good material distribution in the tubular plasma chamber 101.

Those familiar with the art of ICP torches will appreciate that in addition to the embodiments described herein, other front connector designs may also be used in practicing the present invention, including, for example, those that directly bolt the tubular plasma chamber 101 to a processing chamber such as used for processing at least one semiconductor wafer.

In applications where material flow through the front connector unit is not necessary, a modified version of the front connector 301 may be employed. In the modified version, inlet ports 302 and 313 and their corresponding flared inlet channels 312 and 322 are eliminated. Construction of the first and second open ends 314 and 320 and their corresponding cylindrical cavities 317 and 319 remain the same, so that the same tubular plasma chamber 101, tubing 104, cinch nuts 303 and 306, seal rings 304 and 307, O-rings 305 and 308, and slip washer rings can be used with the modified version of the front connector unit. Consequently, easy conversion from one version of the modular ICP torch assembly to another is facilitated as applications for the modular ICP torch assembly change.

In applications where cooling of the tubular plasma chamber 101 is not required, then the modular ICP torch assembly 100 is assembled by first inserting the tubular plasma chamber 101 into the induction coil 103, then attaching the rear and front connector units, in either order, as described above. The tubular jacket 102 and corresponding pair of connection units for attaching the tubular jacket 102 to the tubular plasma chamber 101 are not included in the assembly.

In applications where cooling of the tubular plasma chamber 101 is required, however, then the module ICP torch assembly 100 is assembled by inserting the tubular plasma chamber 101 into the tubular jacket 102, inserting the tubular jacket 102 into the induction coil 103, attaching a pair of connection units at opposing ends of the tubular jacket 102 so as to attach the tubular jacket 102 to the tubular plasma chamber 101, and attaching the rear and front connector units to the ends of the tubular plasma chamber 101 as described above.

The pair of connection units that attach the tubular jacket 102 to the tubular plasma chamber 101 are referred to as detachable first and second connection units. The detachable first connection unit includes a first connector 401 whose side view is shown in detail in FIG. 5. It has a large diameter end 417 through which the tubular jacket 102 is inserted and held in a large cylindrical cavity 420, and a small diameter end 411 through which the tubular plasma chamber 101 passes through so as to fill up a small cylindrical cavity 414. The diameter of the large cylindrical cavity 420 is approximately the same as that of the tubular jacket 102 so that the tubular jacket 102 fits snugly in the large cylindrical cavity 420 with minimal lateral movement when inserted therein. Likewise, the diameter of the small cylindrical cavity 414 is approximately the same as that of the tubular plasma chamber 101 so that the tubular plasma chamber 101 fits snugly in the small cylindrical cavity 414 with minimal lateral movement when inserted therein.

To assemble the first connection unit, a cinch nut 403, a slip washer ring (not shown), a seal ring 407, and a compressible O-ring 405 are each placed in that order around the tubular jacket 102, and slided part way down its surface to get temporarily out of the way. The tubular jacket 102 is then inserted into the large diameter end 417 of the first connector 401 until it stops against an annular rear wall 421 of the large cylindrical cavity 420. The O-ring 405 is then slided back down the outer surface of the tubular jacket 102 until it nears or stops against a tapered wall 419 of the large diameter end 417 of the first connector 401. Likewise, the seal ring 407, slip washer ring (not shown), and cinch nut 403 are also slided back down along the outer surface of the tubular jacket 102 until inner threads of the cinch nut 403 engage outer threads 418 of the first connector 401.

The cinch nut 403 is then screwed into the outer threading of the first connector 401 so that the seal ring 407 is pushed in compressing the O-ring 405 against the tapered wall 419 of the first connector 401, thereby generating compression forces within the thus compressed O-ring 405 that radiate outward from the O-ring 405 and against the seal ring 407, the tapered wall 419, and the outer surface of the tubular jacket 102.

A compressible O-ring 406, a seal ring 408, a slip washer ring (not shown), and a cinch nut 404 are each placed in that order around the exposed rear end of the tubular plasma chamber 101, and slided down its surface towards the small diameter end 411 of the first connector 401 until the O-ring 406 nears or stops against a tapered wall 413 of the small diameter end 411 of the first connector 401. The cinch nut 404 is then screwed into the outer threading 412 of the first connector 401 so the seal ring 408 is pushed into compressing the O-ring 406 against the tapered wall 412, thereby generating compression forces within the thus compressed O-ring 406 that radiate outward from the O-ring 406 and against the seal ring 408, the tapered wall 412, and the outer surface of the tubular plasma chamber 101, so as to securely hold the first connector 401 against the tubular jacket 102 on one end and the tubular plasma chamber 101 on the other end of the first connector 401.

The cinch nut 404, seal ring 408, O-ring 406, and corresponding slip washer ring are identically sized and constructed as their respective counterparts as described in reference to FIGS. 1, 2, and 6~9. The cinch nut 403, seal ring 407, O-ring 405, and corresponding slip washer ring, on the other hand, are each shaped as, but larger their respective counterparts as described in reference to FIGS. 1, 2, and 6~9, since these components are adapted for the larger diameter of the tubular jacket 102.

The detachable second connector unit is similarly constructed as the first detachable connector unit, and attached at the opposite end of the tubular jacket 102 to the tubular plasma chamber 101 in the same manner as described in reference to the first detachable connector unit. After attaching both ends of the tubular jacket 102 to the tubular plasma chamber 101, the detachable rear and front connector units are then attached to the tubular plasma chamber 101 as previously described.

As previously explained, coolant for cooling the tubular plasma chamber 101 is passed over the outer surface of tubular plasma chamber 101 through the annular chamber defined between the concentrically aligned tubular jacket 102 and tubular plasma chamber 101. The coolant, which is provided from an external coolant source, enters an inlet port 402 in the first connector 401 of the detachable first connector unit, flows through an opening 416 of the first connector 401 into the annular chamber, exits the annular chamber on the opposite side of the tubular jacket 102 though an opening in a second connector 501 of the detachable second connector unit, and returns to the external coolant source through an outlet port 502 of the second connector 501. Although the port 402 is referred to as an inlet port and the port 502 is referred to as an outlet port in this example, it is to be appreciated that if the coolant were to flow in the opposite direction, then the port 502 would serve as an inlet port and the port 402 would serve as an outlet port in that case. Therefore, the ports 402 and 502 are referred to as respectively being inlet and outlet ports for convenience only and such terminology should not be used to place any limitation on their actual or claimed use.

Figure 11:
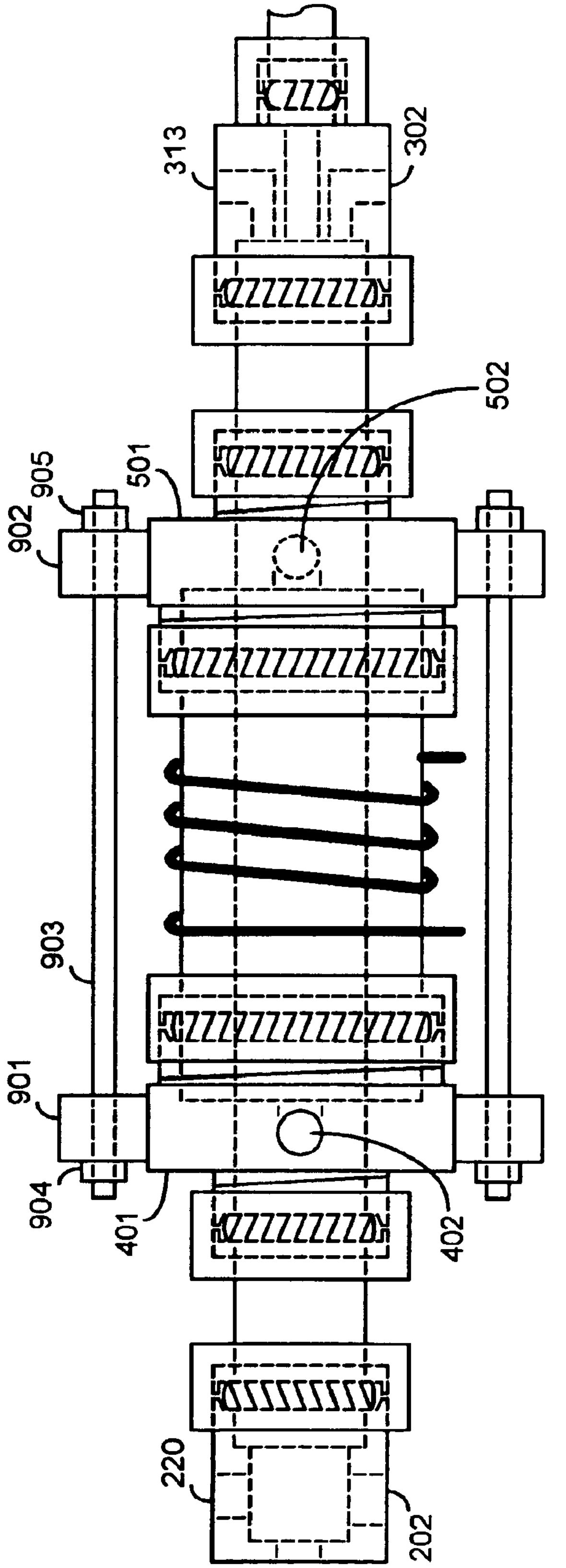
FIG. 11 illustrates a side view of an alternative modular ICP torch assembly utilizing aspects of the present invention.

When the pressure created by the flow of coolant becomes very large, it may be advantageous to provide additional support to hold the tubular jacket 102 in place. FIG. 11 illustrates a top view of a second embodiment of a modular ICP torch assembly wherein a supporting rod 903 helps hold the tubular jacket 102 in place by supporting the first and second connectors from being forced apart by the coolant pressure. The supporting rod 903 has threaded ends which are inserted into mechanical supports 901 and 902 respectively integrated on the first and second connectors 401 and 501. Nuts 904 and 905 screwed into the threaded ends of the supporting rod 903 then hold the supporting rod 903 in place between the mechanical supports 901 and 902 to prevent the first and second connectors 401 and 501 from being forced apart due to the large coolant pressure. For additional and balanced support, a second supporting rod may be installed in the same manner on an opposite side of the modular ICP torch assembly.

Although the various aspects of the present invention have been described with respect to a preferred embodiment, it will be understood that the invention is entitled to full protection within the full scope of the appended claims.

We claim:

1. A modular inductively coupled plasma torch assembly comprising:

a tubular plasma chamber having an outer surface defining an outer diameter;

a tubular jacket having an inner surface defining an inner diameter larger than said tubular plasma chamber outer diameter; and detachable first and second connector units positioned on opposite ends of said tubular jacket so as to hold said tubular plasma chamber concentrically within said tubular jacket and define an annular chamber between said tubular plasma chamber outer surface and said tubular jacket inner surface, wherein said detachable first connector unit includes an inlet port fluidically coupled to said annular chamber and said detachable second connector unit includes an outlet port fluidically coupled to said annular chamber so as to allow a flow of coolant to pass through said annular chamber to cool said tubular plasma chamber outer surface.

2. The modular inductively coupled plasma torch assembly according to claim 1, further comprising an inductor coil disposed concentrically around said tubular jacket.

3. The modular inductively coupled plasma torch assembly according to claim 1, wherein said detachable first connector unit comprises:

first large and first small O-rings, wherein said first large O-ring has an inner diameter suitable for fitting around an outer diameter of said tubular jacket and said first small O-ring has an inner diameter suitable for fitting around said tubular plasma chamber outer diameter; and a first connector having large and small diameter ends, wherein said tubular jacket is positioned concentrically within said large diameter end and held in that position by compressing said first large O-ring so as to apply a force against an outer surface of said tubular jacket, and an exposed portion of said tubular plasma chamber is positioned concentrically within said small diameter end and held in that position by compressing said first small O-ring so as to apply a force against said outer surface of said tubular plasma chamber.

4. The modular inductively coupled plasma torch assembly according to claim 3, wherein said detachable first connector unit further comprises a first large cinch nut screwed into outer threading of said large diameter end of said first connector so as to compress said first large O-ring.

5. The modular inductively coupled plasma torch assembly according to claim 4, wherein said detachable first connector unit further comprises a first large seal ring configured to compress said first large O-ring against a tapered wall of said large diameter of said first connector when said first large cinch nut is screwed into said outer threading of said large diameter end.

6. The modular inductively coupled plasma torch assembly according to claim 5, wherein said detachable first connector unit further comprises a first large slip washer ring inserted between said first large seal ring and said first large cinch nut so as to inhibit torque applied to said first large cinch nut from being transferred to said first large O-ring.

7. The modular inductively coupled plasma torch assembly according to claim 3, wherein said detachable first connector unit further comprises a first small cinch nut screwed into outer threading of said small diameter end of said first connector so as to compress said first small O-ring.

8. The modular inductively coupled plasma torch assembly according to claim 7, wherein said detachable first connector unit further comprises a first small seal ring configured to compress said first small O-ring against a tapered wall of said small diameter end of said first connector when said first small cinch nut is screwed into said outer threading of said small diameter end of said first connector.

9. The modular inductively coupled plasma torch assembly according to claim 8, wherein said detachable first connector unit further comprises a first small slip washer ring inserted between said first small seal ring and said first small cinch nut so as to inhibit torque applied to said first small cinch nut from being transferred to said first small O-ring.

10. The modular inductively coupled plasma torch assembly according to claim 7, wherein said detachable second connector unit comprises:

second large and second small O-rings, wherein said second large O-ring has an inner diameter suitable for fitting around said outer diameter of said tubular jacket, and said second small O-ring has an inner diameter suitable for fitting around said tubular plasma chamber outer diameter; and a second connector having large and small diameter ends, wherein said tubular jacket is positioned concentrically within said large diameter end and held in that position by compressing said second large O-ring so as to apply a force against said outer surface of said tubular jacket, and a second exposed portion of said tubular plasma chamber is positioned concentrically within said small diameter end and held in that position by compressing said second small O-ring so as to apply a force against said outer surface of said tubular plasma chamber.

11. The modular inductively coupled plasma torch assembly according to claim 10, wherein said detachable second connector unit further comprises a second large cinch nut screwed into outer threading of said large diameter end of said second connector so as to laterally compress said second large O-ring.

12. The modular inductively coupled plasma torch assembly according to claim 11, wherein said detachable second connector unit further comprises a second large seal ring configured to compress said second large O-ring against a tapered wall of said large diameter end of said second connector when said second large cinch nut is screwed into said outer threading of said large diameter end of said second connector.

13. The modular inductively coupled plasma torch assembly according to claim 12, wherein said detachable second connector unit further comprises a second large slip washer ring inserted between said second large seal ring and said second large cinch nut so as to inhibit torque applied to said second large cinch nut from being transferred to said second large O-ring.

14. The modular inductively coupled plasma torch assembly according to claim 10, wherein said detachable second connector unit further comprises a second small cinch nut screwed into outer threading of said small diameter end of said second connector so as to compress said second small O-ring.

15. The modular inductively coupled plasma torch assembly according to claim 14, wherein said detachable second connector unit further comprises a second small seal ring configured to compress said second small O-ring against a tapered wall of said small diameter end of said second connector when said second small cinch nut is screwed into said outer threading of said small diameter end.

16. The modular inductively coupled plasma torch assembly according to claim 15, wherein said detachable second connector unit further comprises a second small slip washer ring inserted between said second small seal ring and said second small cinch nut so as to inhibit torque applied to said second small cinch nut from being transferred to said second small O-ring.

17. The modular inductively coupled plasma torch assembly according to claim 2, further comprising a detachable rear connector unit positioned at a rear end of said tubular plasma chamber, wherein said detachable rear connector unit includes a first inlet port fluidically coupled to an interior of said tubular plasma chamber so as to allow a flow of a first material to pass through said tubular plasma chamber for generating said plasma while said inductor coil is energized.

18. The modular inductively coupled plasma torch assembly according to claim 17, wherein said detachable rear connector unit includes a second inlet port fluidically coupled to said interior of said tubular plasma chamber so as to allow a flow of a second material to pass through said tubular plasma chamber for generating said plasma while said inductor coil is energized.

19. The modular inductively coupled plasma torch assembly according to claim 18, wherein said first and said second materials are the same material.

20. The modular inductively coupled plasma torch assembly according to claim 17, wherein said first inlet port is fluidically coupled to said interior of said tubular plasma chamber through an elongated cavity having a diameter smaller than an inner diameter of said tubular plasma chamber.

21. The modular inductively coupled plasma torch assembly according to claim 17, wherein said detachable rear connector unit comprises:

a third small O-ring having an inner diameter suitable for fitting around said tubular plasma chamber outer diameter; and a third connector having an open end, wherein an end of said tubular plasma chamber is positioned within said open end of said third connector and held in that position by compressing said third small O-ring so as to apply a force against said outer surface of said tubular plasma chamber.

22. The modular inductively coupled plasma torch assembly according to claim 21, wherein said detachable rear connector unit further comprises a third small cinch nut screwed into outer threading of said open end of said third connector so as to compress said third small O-ring.

23. The modular inductively coupled plasma torch assembly according to claim 22, wherein said detachable rear connector unit further comprises a third small seal ring configured to compress said third small O-ring against a tapered wall of said open end of said third connector when said third small cinch nut is screwed into said outer threading of said open end.

24. The modular inductively coupled plasma torch assembly according to claim 23, wherein said detachable rear connector unit further comprises a third small slip washer ring inserted between said third small seal ring and said third small cinch nut so as to inhibit torque applied to said third small cinch nut from being transferred to said third small O-ring.

25. The modular inductively coupled plasma torch assembly according to claim 2, further comprising a detachable front connector unit including:

a fourth small O-ring having an inner diameter suitable for fitting around said tubular plasma chamber outer diameter; and a fourth connector having first and second open ends, wherein an end of said tubular plasma chamber is positioned within said first open end and held in that position by compressing said fourth small O-ring so as to apply a force against said outer surface of said tubular plasma chamber.

26. The modular inductively coupled plasma torch assembly according to claim 25, wherein said second open end of said fourth connector fluidically couples said tubular plasma chamber to a processing chamber for processing at least one semiconductor wafer.

27. The modular inductively coupled plasma torch assembly according to claim 25, wherein said detachable front connector unit further comprises a fourth small cinch nut screwed into outer threading of said first open end of said fourth connector so as to compress said fourth small O-ring.

28. The modular inductively coupled plasma torch assembly according to claim 27, wherein said detachable front connector unit further comprises a fourth small seal ring configured to compress said fourth small O-ring against a tapered wall of said first open end when said fourth small cinch nut is screwed into said outer threading of said first open end.

29. The modular inductively coupled plasma torch assembly according to claim 25, wherein said second open end has a smaller inner diameter than said first open end of said fourth connector.

30. The modular inductively coupled plasma torch assembly according to claim 25, wherein said detachable front connector unit includes a third inlet port fluidically coupled to said interior of said tubular plasma chamber and configured so as to allow a third material to flow back towards a rear end of said tubular plasma chamber while said inductor coil is energized to generate said plasma.

31. The modular inductively coupled plasma torch assembly according to claim 30, wherein said third inlet port is fluidically coupled to said interior of said tubular plasma chamber through a first flared channel so that said third material initially flows back at an angle towards said rear end of said tubular plasma chamber.

32. The modular inductively coupled plasma torch assembly according to claim 30, wherein said detachable front connector unit includes a fourth inlet port fluidically coupled to said interior of said tubular plasma chamber and configured so as to allow a fourth material to flow back towards said rear end of said tubular plasma chamber while said inductor coil is energized to generate said plasma.

33. The modular inductively coupled plasma torch assembly according to claim 32, wherein said fourth inlet port is fluidically coupled to said interior of said tubular plasma chamber through a second flared channel so that said fourth material initially flows back at an angle towards said rear end of said tubular plasma chamber that is different than said third material flow.

34. The modular inductively coupled plasma torch assembly according to claim 33, wherein said third and said fourth materials are the same material.

35. The modular inductively coupled plasma torch assembly according to claim 2, further comprising a detachable member rigidly connecting said detachable first and said detachable second connector units so as to be positioned and held on opposite sides of said tubular jacket.

36. The modular inductively coupled plasma torch assembly according to claim 25, wherein said detachable front connector unit includes a third inlet port fluidically coupled to said interior of said tubular plasma chamber and configured so as to allow a third material to flow back towards a rear end of said tubular plasma chamber while said inductor coil is energized to generate said plasma.

37. The modular inductively coupled plasma torch assembly according to claim 36, wherein said third inlet port is fluidically coupled to said interior of said tubular plasma chamber through a first flared channel so that said third material initially flows back at an angle towards said rear end of said tubular plasma chamber.

38. The modular inductively coupled plasma torch assembly according to claim 37, wherein said detachable front connector unit includes a fourth inlet port fluidically coupled to said interior of said tubular plasma chamber and configured so as to allow a fourth material to flow back towards said rear end of said tubular plasma chamber while said inductor coil is energized to generate said plasma.

39. The modular inductively coupled plasma torch assembly according to claim 38, wherein said fourth inlet port is fluidically coupled to said interior of said tubular plasma chamber through a second flared channel so that said fourth material initially flows back at an angle towards said rear end of said tubular plasma chamber that is different than said third material flow.

40. The modular inductively coupled plasma torch assembly according to claim 38, wherein said third and said fourth materials are the same material.

41. A modular inductively coupled plasma torch assembly comprising:

a tubular jacket;

a tubular plasma chamber disposed concentrically within said tubular jacket so as to define an annular chamber between an outer surface of said tubular plasma chamber and inner surface of said tubular jacket, and having rear and front ends extending out of said tubular jacket;

an inductor coil disposed concentrically around said tubular jacket so as to generate plasma within said tubular plasma chamber when energized;

detachable first and second connector units positioned on opposite ends of said tubular jacket so as to hold said tubular plasma chamber concentrically within said tubular jacket and provide a flow of coolant through said annular chamber to cool said tubular plasma chamber outer surface; and a detachable rear connector unit positioned at said rear end of said tubular plasma chamber to provide a flow of material through said tubular plasma chamber for generating said plasma when said inductor coil is energized.

42. The modular inductively coupled plasma torch assembly according to claim 41 further comprising a detachable front connector unit positioned at said front end of said tubular plasma chamber for fluidically coupling an interior of said tubular plasma chamber to a processing chamber for processing at least one semiconductor wafer.

43. The modular inductively coupled plasma torch assembly according to claim 42, wherein said detachable first and said detachable second connector units, said rear connector unit, and said front connector unit are at least partially held in their respective positions by compressing O-rings that apply forces radiating outward and against said tubular plasma chamber outer surface.

* * * * *